US011203692B2

(12) United States Patent
Hoermann et al.

(10) Patent No.: US 11,203,692 B2
(45) Date of Patent: Dec. 21, 2021

(54) PLASMA GAS THROAT ASSEMBLY AND METHOD

(71) Applicant: MONOLITH MATERIALS, INC., Redwood City, CA (US)

(72) Inventors: Alexander F. Hoermann, Menlo Park, CA (US); Roscoe W. Taylor, Kingwood, TX (US); Nils Severin Myklebust, Trondheim (NO)

(73) Assignee: MONOLITH MATERIALS, INC., Lincoln, NE (US)

( * ) Notice: Subject to any disclaimer, the term of this patent is extended or adjusted under 35 U.S.C. 154(b) by 0 days.

(21) Appl. No.: 16/180,635

(22) Filed: Nov. 5, 2018

(65) Prior Publication Data

US 2019/0338139 A1 Nov. 7, 2019

Related U.S. Application Data

(63) Continuation of application No. 14/601,761, filed on Jan. 21, 2015, now Pat. No. 10,138,378.

(60) Provisional application No. 61/933,479, filed on Jan. 30, 2014.

(51) Int. Cl.
*B01J 19/08* (2006.01)
*C09C 1/48* (2006.01)

(52) U.S. Cl.
CPC ............ *C09C 1/485* (2013.01); *B01J 19/088* (2013.01); *C09C 1/48* (2013.01); *B01J 2219/0809* (2013.01); *B01J 2219/0815* (2013.01); *B01J 2219/0839* (2013.01); *B01J 2219/0841* (2013.01); *B01J 2219/0869* (2013.01); *B01J 2219/0875* (2013.01); *B01J 2219/0894* (2013.01)

(58) Field of Classification Search
CPC ...................................................... B01J 19/088
See application file for complete search history.

(56) References Cited

U.S. PATENT DOCUMENTS

| | | | |
|---|---|---|---|
| 1,339,225 A | 5/1920 | Rose | |
| 1,536,612 A | 5/1925 | Lewis | |
| 1,597,277 A | 8/1926 | Jakowsky | |
| 2,062,358 A | 9/1932 | Frolich | |
| 2,002,003 A | 5/1935 | Eisenhut et al. | |
| 2,039,312 A | 5/1936 | Goldman | |
| 2,393,106 A | 1/1946 | Johnson et al. | |
| 2,557,143 A | 6/1951 | Royster | |
| 2,572,851 A | 10/1951 | Gardner et al. | |
| 2,603,669 A | 7/1952 | Chappell | |
| 2,616,842 A | 11/1952 | Sheer et al. | |
| 2,785,964 A | 3/1957 | Pollock | |
| 2,850,403 A | 9/1958 | Day | |
| 2,851,403 A | 9/1958 | Hale | |
| 2,897,071 A | 7/1959 | Gilbert | |
| 2,951,143 A | 8/1960 | Anderson et al. | |
| 3,009,783 A | 11/1961 | Sheer et al. | |
| 3,073,769 A | 1/1963 | Doukas | |
| 3,127,536 A | 3/1964 | McLane | |
| 3,288,696 A | 11/1966 | Orbach | |
| 3,307,923 A | 3/1967 | Ruble | |
| 3,308,164 A | 3/1967 | Shepard | |
| 3,309,780 A | 3/1967 | Goins | |
| 3,331,664 A | 7/1967 | Jordan | |
| 3,342,554 A | 9/1967 | Jordan et al. | |
| 3,344,051 A | 9/1967 | Latham, Jr. | |
| 3,408,164 A | 10/1968 | Johnson | |
| 3,409,403 A | 11/1968 | Bjornson et al. | |
| 3,420,632 A | 1/1969 | Ryan | |
| 3,431,074 A | 3/1969 | Jordan | |
| 3,453,488 A | 7/1969 | Cann et al. | |
| 3,464,793 A | 9/1969 | Jordan et al. | |
| 3,619,138 A | 11/1971 | Gunnell | |
| 3,619,140 A | 11/1971 | Morgan et al. | |
| 3,637,974 A | 1/1972 | Tajbl et al. | |
| 3,673,375 A | 6/1972 | Camacho | |
| 3,725,103 A | 4/1973 | Jordan et al. | |
| 3,922,335 A | 11/1975 | Jordan et al. | |
| 3,981,654 A | 9/1976 | Rood et al. | |
| 3,981,659 A | 9/1976 | Myers | |
| 3,984,743 A | 10/1976 | Horie | |
| 3,998,934 A | 12/1976 | Vanderveen | |
| 4,028,072 A | 6/1977 | Braun et al. | |
| 4,035,336 A | 7/1977 | Jordan et al. | |
| 4,057,396 A | 11/1977 | Matovich | |
| 4,075,160 A | 2/1978 | Mills et al. | |
| 4,088,741 A | 5/1978 | Takewell | |
| 4,101,639 A | 7/1978 | Surovikin et al. | |
| 4,199,545 A | 4/1980 | Matovich | |
| 4,282,199 A | 8/1981 | Lamond et al. | |
| 4,289,949 A | 9/1981 | Raaness et al. | |

(Continued)

FOREIGN PATENT DOCUMENTS

| | | |
|---|---|---|
| AU | 28970/71 A | 11/1972 |
| CA | 830378 A | 12/1969 |

(Continued)

OTHER PUBLICATIONS

Biscoe, et al., An X-ray study of carbon black. Journal of Applied physics, 1942; 13: 364-371.

(Continued)

*Primary Examiner* — Stuart L Hendrickson
(74) *Attorney, Agent, or Firm* — Wilson Sonsini Goodrich & Rosati

(57) ABSTRACT

A method and apparatus for making carbon black having increased surface area, reduced grit and/or reduced extract levels. A plasma gas is flowed into a plasma forming region to form a plasma. The plasma then flows through a throat region which is narrower than the plasma forming section, which is connected to a separate carbon black forming region. This causes the plasma to accelerate and become turbulent prior to the exit point in the throat region. The carbon black forming feedstock is injected into the turbulence created by the throat region at a point above, at or near the exit point, resulting in the formation of a carbon black in the separate carbon black forming region. The throat region and/or injector region can be cooled, e.g., water plasma gas cooled.

9 Claims, 1 Drawing Sheet

(56) References Cited

U.S. PATENT DOCUMENTS

| | | |
|---|---|---|
| 4,292,291 A | 9/1981 | Rothbuhr et al. |
| 4,317,001 A | 2/1982 | Silver et al. |
| 4,372,937 A | 2/1983 | Johnson |
| 4,404,178 A | 9/1983 | Johnson et al. |
| 4,452,771 A | 6/1984 | Hunt |
| 4,431,624 A | 8/1984 | Casperson |
| 4,472,172 A | 9/1984 | Sheer et al. |
| 4,543,470 A | 9/1985 | Santen et al. |
| 4,553,981 A | 11/1985 | Fuderer |
| 4,577,461 A | 3/1986 | Cann |
| 4,601,887 A | 7/1986 | Dorn et al. |
| 4,678,888 A | 7/1987 | Camacho et al. |
| 4,689,199 A | 8/1987 | Eckert et al. |
| 4,755,371 A | 7/1988 | Dickerson |
| 4,765,964 A | 8/1988 | Gravley et al. |
| 4,787,320 A | 11/1988 | Raaness et al. |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,147,998 A | 9/1992 | Tsantrizos et al. |
| 5,206,880 A | 4/1993 | Olsson |
| 5,222,448 A | 6/1993 | Morgenthaler et al. |
| 5,352,289 A | 10/1994 | Weaver et al. |
| 5,399,957 A | 3/1995 | Vierboom et al. |
| 5,427,762 A | 6/1995 | Steinberg et al. |
| 5,476,826 A | 12/1995 | Greenwald et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A | 6/1996 | Lynum et al. |
| 5,593,644 A | 1/1997 | Norman et al. |
| 5,604,424 A | 2/1997 | Shuttleworth |
| 5,611,947 A | 3/1997 | Vavruska |
| 5,673,285 A | 9/1997 | Wittle et al. |
| 5,717,293 A | 2/1998 | Sellers |
| 5,725,616 A | 3/1998 | Lynum et al. |
| 5,749,937 A | 5/1998 | Detering et al. |
| 5,935,293 A | 8/1999 | Detering et al. |
| 5,951,960 A | 9/1999 | Lynum et al. |
| 5,989,512 A | 11/1999 | Lynum et al. |
| 5,997,837 A | 12/1999 | Lynum et al. |
| 6,058,133 A | 5/2000 | Bowman et al. |
| 6,068,827 A | 5/2000 | Lynum et al. |
| 6,099,696 A | 8/2000 | Schwob et al. |
| 6,188,187 B1 | 2/2001 | Harlan |
| 6,197,274 B1 | 3/2001 | Mahmud et al. |
| 6,277,350 B1 | 8/2001 | Gerspacher |
| 6,358,375 B1 | 3/2002 | Schwob |
| 6,380,507 B1 | 4/2002 | Childs |
| 6,395,197 B1 | 5/2002 | Detering et al. |
| 6,403,697 B1 | 6/2002 | Mitsunaga et al. |
| 6,441,084 B1 | 8/2002 | Lee et al. |
| 6,442,950 B1 | 9/2002 | Tung |
| 6,444,727 B1 | 9/2002 | Yamada et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 6,955,707 B2 | 10/2005 | Ezell et al. |
| 7,167,240 B2 | 1/2007 | Stagg |
| 7,294,314 B2 | 11/2007 | Graham |
| 7,312,415 B2 | 12/2007 | Ohmi et al. |
| 7,360,309 B2 | 4/2008 | Vaidyanathan et al. |
| 7,431,909 B1 | 10/2008 | Rumpf et al. |
| 7,452,514 B2 | 11/2008 | Fabry et al. |
| 7,462,343 B2 | 12/2008 | Lynum et al. |
| 7,563,525 B2 | 7/2009 | Ennis |
| 7,582,184 B2 | 9/2009 | Tomita et al. |
| 7,623,340 B1 | 11/2009 | Song et al. |
| 7,635,824 B2 | 12/2009 | Miki et al. |
| 7,655,209 B2 | 2/2010 | Rumpf et al. |
| 7,777,151 B2 | 8/2010 | Kuo |
| 7,968,191 B2 | 6/2011 | Hampden-Smith et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 | 12/2012 | Hamby et al. |
| 8,443,741 B2 | 5/2013 | Chapman et al. |
| 8,471,170 B2 | 6/2013 | Li et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,710,136 B2 | 4/2014 | Yurovskaya et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 9,095,835 B2 | 8/2015 | Skoptsov et al. |
| 9,315,735 B2 | 4/2016 | Cole et al. |
| 9,445,488 B2 | 9/2016 | Foret |
| 9,574,086 B2 | 2/2017 | Johnson et al. |
| 9,679,750 B2 | 6/2017 | Choi et al. |
| 10,100,200 B2 | 10/2018 | Johnson et al. |
| 10,138,378 B2 | 11/2018 | Hoermman et al. |
| 10,370,539 B2 | 8/2019 | Johnson et al. |
| 10,618,026 B2 | 4/2020 | Taylor et al. |
| 10,808,097 B2 | 10/2020 | Hardman et al. |
| 2001/0029888 A1 | 10/2001 | Sindarrajan et al. |
| 2001/0039797 A1 | 11/2001 | Cheng |
| 2002/0000085 A1 | 1/2002 | Hall et al. |
| 2002/0050323 A1 | 5/2002 | Moisan et al. |
| 2002/0051903 A1 | 5/2002 | Masuko et al. |
| 2002/0141476 A1 | 10/2002 | Varela |
| 2002/0157559 A1 | 10/2002 | Brunet et al. |
| 2003/0103858 A1 | 6/2003 | Baran et al. |
| 2003/0152184 A1 | 8/2003 | Shehane et al. |
| 2004/0047779 A1 | 3/2004 | Denison |
| 2004/0071626 A1 | 4/2004 | Smith et al. |
| 2004/0081609 A1 | 4/2004 | Green et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0147188 A1 | 6/2010 | Mamak et al. |
| 2010/0249353 A1 | 9/2010 | MacIntosh et al. |
| 2011/0036014 A1 | 2/2011 | Tsangaris et al. |

(56) References Cited

U.S. PATENT DOCUMENTS

| | | |
|---|---|---|
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0138766 A1 | 6/2011 | Elkady et al. |
| 2011/0155703 A1 | 6/2011 | Winn |
| 2011/0180513 A1 | 7/2011 | Luhrs et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Barker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044516 A1 | 2/2015 | Kyrlidis et al. |
| 2015/0056516 A1 | 2/2015 | Hellring et al. |
| 2015/0064099 A1 | 3/2015 | Nester et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2016/0030856 A1 | 2/2016 | Kaplan et al. |
| 2016/0243518 A1 | 8/2016 | Spitzl |
| 2016/0293959 A1 | 10/2016 | Blizanac et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2019/0048200 A1 | 2/2019 | Johnson et al. |
| 2019/0100658 A1 | 4/2019 | Taylor et al. |
| 2019/0153234 A1 | 5/2019 | Hoermann et al. |
| 2020/0140691 A1 | 5/2020 | Johnson et al. |
| 2020/0239696 A1 | 7/2020 | Johnson et al. |
| 2020/0291237 A1 | 9/2020 | Hardman et al. |

FOREIGN PATENT DOCUMENTS

| | | |
|---|---|---|
| CA | 964405 A1 | 3/1975 |
| CA | 2 353 752 A1 | 1/2003 |
| CA | 2 621 749 A1 | 8/2009 |
| CN | 86104761 A | 2/1987 |
| CN | 1076206 A | 9/1993 |
| CN | 1077329 A | 10/1993 |
| CN | 1078727 A | 11/1993 |
| CN | 1086527 A | 5/1994 |
| CN | 1196032 A | 10/1998 |
| CN | 1458966 A | 11/2003 |
| CN | 1644650 A | 7/2005 |
| CN | 101092691 A | 12/2007 |
| CN | 101198442 A | 6/2008 |
| CN | 201087175 Y | 7/2008 |
| CN | 102007186 A | 4/2011 |
| CN | 102060281 A | 5/2011 |
| CN | 102108216 A | 6/2011 |
| CN | 102350506 A | 2/2012 |
| CN | 102612549 A | 7/2012 |
| CN | 102666686 A | 9/2012 |
| CN | 202610344 U | 12/2012 |
| CN | 102869730 A | 1/2013 |
| CN | 102993788 A | 3/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 105070518 A | 11/2015 |
| CN | 105073906 A | 11/2015 |
| CN | 205472672 U | 8/2016 |
| DE | 211457 A3 | 7/1984 |
| DE | 198 07 224 A1 | 8/1999 |
| EA | 200300389 A1 | 12/2003 |
| EP | 0315442 A2 | 5/1989 |
| EP | 0 325 689 A1 | 8/1989 |
| EP | 0616600 A1 | 9/1994 |
| EP | 0 635 044 B1 | 2/1996 |
| EP | 0 635 043 B1 | 6/1996 |
| EP | 0 861 300 A1 | 9/1998 |
| EP | 0982378 A1 | 3/2000 |
| EP | 1017622 A1 | 7/2000 |
| EP | 1 188 801 A1 | 3/2002 |
| EP | 1 088 854 A2 | 4/2010 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |
| EP | 3350855 A1 | 7/2018 |
| EP | 3448553 A1 | 3/2019 |
| EP | 3448936 A1 | 3/2019 |
| EP | 3592810 A1 | 1/2020 |
| FR | 1249094 A | 12/1960 |
| FR | 2 891 434 A1 | 3/2007 |
| FR | 2 937 029 A1 | 4/2010 |
| GB | 395 893 A | 7/1933 |
| GB | 987498 | 3/1965 |
| GB | 1068519 A | 5/1967 |
| GB | 1 400 266 A | 7/1975 |
| GB | 1 492 346 A | 11/1977 |
| GB | 2419883 A | 5/2006 |
| JP | S5021983 B1 | 7/1975 |
| JP | S5987800 A | 5/1984 |
| JP | 4-228270 A | 8/1992 |
| JP | H06302527 A | 10/1994 |
| JP | 6-322615 A | 11/1994 |
| JP | H07307165 A | 11/1995 |
| JP | H08319552 A | 12/1996 |
| JP | 9-316645 A | 12/1997 |
| JP | 11-123562 A | 5/1999 |
| JP | 2001253974 A | 9/2001 |
| JP | 2004-300334 A | 10/2004 |
| JP | 2005-235709 A | 9/2005 |
| JP | 2005-243410 A | 9/2005 |
| KR | 10-2008-105344 A | 12/2008 |
| KR | 2014-0075261 A | 6/2014 |
| RU | 2425795 C2 | 8/2011 |
| RU | 2488984 C2 | 7/2013 |
| TW | 200418933 A | 10/2004 |
| WO | WO-9204415 A1 | 3/1992 |
| WO | 93/12031 A1 | 6/1993 |

(56) References Cited

FOREIGN PATENT DOCUMENTS

| | | |
|---|---|---|
| WO | WO-9312633 A1 | 6/1993 |
| WO | 93/18094 A1 | 9/1993 |
| WO | 93/20153 A1 | 10/1993 |
| WO | WO-9320152 A1 | 10/1993 |
| WO | 93/23331 A1 | 11/1993 |
| WO | 94/08747 A1 | 4/1994 |
| WO | 97/03133 A1 | 1/1997 |
| WO | 98/13428 A1 | 4/1998 |
| WO | WO-0018682 A1 | 4/2000 |
| WO | WO-0224819 A1 | 3/2002 |
| WO | 03/014018 A1 | 2/2003 |
| WO | WO-2004083119 A1 | 9/2004 |
| WO | WO-2005054378 A1 | 6/2005 |
| WO | WO-2010040840 A2 | 4/2010 |
| WO | 2012/015313 A1 | 2/2012 |
| WO | 2012/067546 A2 | 5/2012 |
| WO | 2012/094743 A1 | 7/2012 |
| WO | 2012/149170 A1 | 11/2012 |
| WO | 2013/134093 A1 | 9/2013 |
| WO | 2013/184074 A1 | 12/2013 |
| WO | 2013/185219 A1 | 12/2013 |
| WO | 2014/000108 A1 | 1/2014 |
| WO | 2014/012169 A1 | 1/2014 |
| WO | WO-2014149455 A1 | 9/2014 |
| WO | 2015/049008 A1 | 4/2015 |
| WO | WO-2015051893 A1 | 4/2015 |
| WO | 2015/093947 A1 | 6/2015 |
| WO | 2015/116797 A1 | 8/2015 |
| WO | 2015/116798 A1 | 8/2015 |
| WO | 2015/116800 A1 | 8/2015 |
| WO | 2015/116807 A1 | 8/2015 |
| WO | 2015/116811 A1 | 8/2015 |
| WO | 2015/116943 A2 | 8/2015 |
| WO | 2016/012367 A1 | 1/2016 |
| WO | 2016/014641 A1 | 8/2016 |
| WO | 2016/126598 A1 | 8/2016 |
| WO | 2016/126599 A1 | 8/2016 |
| WO | 2016/126600 A1 | 8/2016 |
| WO | 2017/019683 A1 | 2/2017 |
| WO | 2017/027385 A1 | 2/2017 |
| WO | 2017/034980 A1 | 3/2017 |
| WO | 2017/044594 A1 | 3/2017 |
| WO | 2017/048621 A1 | 3/2017 |
| WO | 2017/190015 A1 | 11/2017 |
| WO | 2017/190045 A1 | 11/2017 |
| WO | 2018/165483 A1 | 9/2018 |
| WO | 2018/195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |

OTHER PUBLICATIONS

Co-pending U.S. Appl. No. 16/802,174, inventors Hardman; Ned J. et al., filed Feb. 26, 2020.
Co-pending U.S. Appl. No. 16/802,190, inventor Hardman; Ned J., filed Feb. 26, 2020.
Co-pending U.S. Appl. No. 16/802,212, inventors Hardman; Ned J. et al., filed Feb. 26, 2020.
Co-pending U.S. Appl. No. 16/807,550, inventors Taylor; Roscoe W. et al., filed Mar. 3, 2020.
Co-pending U.S. Appl. No. 16/855,276, inventors Hardman; Ned J. et al., filed Apr. 22, 2020.
Co-pending U.S. Appl. No. 16/892,199, inventors Moss; John Jared et al., filed Jun. 3, 2020.
Co-pending U.S. Appl. No. 17/021,197, inventors Hardman; Ned J. et al., filed Sep. 15, 2020.
Co-pending U.S. Appl. No. 17/031,484, inventors Johnson; Peter L. et al., filed Sep. 24, 2020.
Co-pending U.S. Appl. No. 17/062,075, inventors Cardinal; Christopher J.-P. et al., filed Oct. 2, 2020.
Co-pending U.S. Appl. No. 17/072,416, inventors Taylor; Roscoe W. et al., filed Oct. 16, 2020.
Database WPI, Week 200323, 2017 Clarivate Analytics. Thomson Scientific, London, GB; Database accession No. 2003-239603, XP002781693.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
Hernandez, et al. Comparison of carbon nanotubes and nanodisks as percolative fillers in electrically conductive composites. Scripta Materialia 58 (2008) 69-72.
International Search Report and Written Opinion for Application No. PCT/US2015/013482 dated Jun. 17, 2015.
International Search Report and Written Opinion for Application No. PCT/US2015/013484 dated Apr. 22, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report for Application No. PCT/US2015/13482 dated Jun. 17, 2015.
International Search Report for Application No. PCT/US2015/13487 dated Jun. 16, 2015.
Medalia, et al., Tinting Strength of Carbon Black. Journal of Colloid and Interface Science 40.2. (1972).
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
U.S. Appl. No. 14/591,541 Notice of Allowance dated Sep. 17, 2018.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,528 Office Action dated Jan. 17, 2019.
U.S. Appl. No. 14/591,528 Office Action dated Oct. 28, 2019.
U.S. Appl. No. 14/591,528 Office Action dated Sep. 11, 2020.
U.S. Appl. No. 14/601,761 Notice of Allowance dated Feb. 9, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/610,299 Notice of Allowance dated Feb. 20, 2020.
U.S. Appl. No. 14/610,299 Office Action dated Sep. 25, 2018.
U.S. Appl. No. 15/221,088 Office Action dated Dec. 4, 2019.
U.S. Appl. No. 15/221,088 Office Action dated Mar. 7, 2019.
U.S. Appl. No. 15/229,608 Office Action dated Apr. 8, 2019.
U.S. Appl. No. 15/229,608 Office Action dated May 15, 2020.
U.S. Appl. No. 15/229,608 Office Action dated Oct. 25, 2019.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated May 31, 2019.
U.S. Serial No, 15/262,539 Notice of Allowance dated Jul. 23, 2020.
U.S. Appl. No. 15/262,539 Notice of Allowance dated Jun. 18, 2020.
U.S. Appl. No. 15/262,539 Office Action dated Sep. 19, 2019.
U.S. Appl. No. 15/410,283 Office Action dated Jan. 16, 2020.

(56) References Cited

OTHER PUBLICATIONS

U.S. Appl. No. 15/410,283 Office Action dated Jul. 31, 2020.
U.S. Appl. No. 15/410,283 Office Action dated Mar. 12, 2019.
U.S. Appl. No. 15/548,346 Office Action dated May 4, 2020.
U.S. Appl. No. 15/548,346 Office Action dated Oct. 22, 2019.
U.S. Appl. No. 15/548,348 Notice of Allowance dated Dec. 12, 2019.
U.S. Appl. No. 15/548,352 Office Action dated Aug. 11, 2020.
U.S. Appl. No. 15/548,352 Office Action dated Jan. 31, 2020.
U.S. Appl. No. 15/548,352 Office Action dated May 9, 2019.
U.S. Appl. No. 16/097,035 Office Action dated Oct. 30, 2020.
U.S. Appl. No. 16/097,039 Office Action dated Nov. 18, 2020.
U.S. Appl. No. 16/159,144 Office Action dated Mar. 26, 2020.
AP 42, Fifth Edition, vol. I, Chapter 6: Organic Chemical Process Industry, Section 6.1: Carbon Black.
Ayala et al., "Carbon Black Elastomer Interaction" Rubber Chemistry and Technology, 1991, pp. 19-39.
Bakken et al. "Thermal plasma process development in Norway." Pure and applied Chemistry 70.6 (1998): 1223-1228.
Boehm, "Some Aspects of Surface Chemistry of Carbon Blacks and Other Carbons", Carbon 1994, p. 759.
Breeze, "Raising steam plant efficiency—Pushing the steam cycle boundaries." PEI Magazine 20.4 (2012).
Cataldo, "The impact of a fullerene-like concept in carbon black science," Carbon (2002) 40:157-162.
Chiesa et al., "Using Hydrogen as Gas Turbine Fuel". ASME. J. Eng. Gas Turbines Power (2005),127(1):73-80. doi:10.1115/1.1787513.
Cho et al. "Conversion of natural gas to hydrogen and carbon black by plasma and application of plasma black", Symposia—American Chemical Society, Div. Fuel Chem. (2004), 49:181-183.
Donnet et al. "Observation of Plasma-Treated Carbon Black Surfaces by Scanning Tunnelling Microscopy," Carbon (1994) 32(2):199-206.
Donnet, Basal and Wang, "Carbon Black", New York: Marcel Dekker, 1993 pp. 46, 47 and 54.
Fabry et al., "Carbon black processing by thermal plasma. Analysis of the particle formation mechanism." Chemical Engineering Science (2001) 56:2123-2132.
Fulcheri et al., "From methane to hydrogen, carbon black and water," Int. J. Hydrogen Energy (1995) 20(3):197-202.
Fulcheri et al., "Plasma processing: a step towards the production of new grades of carbon black." Carbon (2002) 40:169-176.
Garberg, et al. "A transmission electron microscope and electron diffraction study of carbon nanodisks." Carbon 46.12 (2008): 1535-1543.
Grivei, et al. "A clean process for carbon nanoparticles and hydrogen production from plasma hydrocarbon cracking." Publishable Report, European Commission JOULE III Programme, Project No. JOE3-CT97-0057, circa 2000.
Høyer, et al. "Microelectromechanical strain and pressure sensors based on electric field aligned carbon cone and carbon black particles in a silicone elastomer matrix." Journal of Applied Physics 112.9 (2012): 094324.
Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.
Larouche et al. "Nitrogen Functionalization of Carbon Black in a Thermo-Convective Plasma Reactor," Plasma Chem Plasma Process (2011) 31:635-647.
Naess et al. "Carbon nanocones: wall structure and morphology." Science and Technology of advanced materials (2009), 7 pages.
Polman et al., "Reduction of CO2 emissions by adding hydrogen to natural gas." IEA Green House Gas R&D programme (2003).
Pristavita, et al. "Carbon blacks produced by thermal plasma: the influence of the reactor geometry on the product morphology." Plasma Chemistry and Plasma Processing 30.2 (2010): 267-279.
Pristavita, et al. "Carbon nanoparticle production by inductively coupled thermal plasmas: controlling the thermal history of particle nucleation." Plasma Chemistry and Plasma Processing 31.6 (2011): 851-866.
Pristavita, et al. "Volatile Compounds Present in Carbon Blacks Produced by Thermal Plasmas." Plasma Chemistry and Plasma Processing 31.6 (2011): 839-850.
Reese, J. (2017). Resurgence in American manufacturing will be led by the rubber and tire industry. Rubber World. 255. 18-21 and 23.
Reynolds, "Electrode Resistance: How Important is Surface Area" Oct. 10, 2016. p. 3 para[0001]; Figure 3; Retrieved from http://electrofishing.net/2016/10/10/electrode-resistance-how-important-is-surface-area/ on May 8, 2018.
Sun et al., "Preparation of carbon black via arc discharge plasma enhanced by thermal pyrolysis", Diamond & Related Materials (2015), doi: 10.1016/j.diamond.2015.11.004, 47 pages.
Tsujikawa, Y., and T. Sawada. "Analysis of a gas turbine and steam turbine combined cycle with liquefied hydrogen as fuel." International Journal of Hydrogen Energy 7.6 (1982): 499-505.
U.S. Environmental Protection Agency, "Guide to Industrial Assessments for Pollution Prevention and Energy Efficiency," EPA 625/R-99/003, 1999.
Verfondern, K., "Nuclear Energy for Hydrogen Production", Schriften des Forschungzentrum Julich, vol. 58, 2007.
Wikipedia "Heating Element" Oct. 14, 2016. p. 1 para[0001]. Retrieved from https://en.wikipedia.org/w/index.php?title=Heating_element&oldid=744277540 on May 9, 2018.
Wikipedia "Joule Heating" Jan. 15, 2017. p. 1 para[0002]. Retrieved from https://en.wikipedia.org/w/index.php?title=Joule_heating&oldid=760136650 on May 9, 2018.
Corrected Notice of Allowance dated Feb. 9, 2018 in U.S. Appl. No. 14/601,761.
Ex Parte Quayle Action dated May 19, 2017 in U.S. Appl. No. 14/601,761.
Extended European Search Report from EP Application No. 15742910.1 dated Jul. 18, 2017.
Extended European Search Report from EP Application No. 15743214.7 dated Jan. 16, 2018.
Extended European Search Report from EP Application No. 16747055.8 dated Jun. 27, 2018.
Extended European Search Report from EP Application No. 16747056.6 dated Jun. 27, 2018.
Extended European Search Report from EP Application No. 16747057.4 dated Oct. 9, 2018.
Extended European Search Report from EP Application No. 16835697.0 dated Nov. 28, 2018.
Final Office Action dated Aug. 3, 2016 in U.S. Appl. No. 14/601,793.
Final Office Action dated Jul. 11, 2016 in U.S. Appl. No. 14/591,476.
Final Office Action dated Jul. 14, 2016 in U.S. Appl. No. 14/591,541.
Final Office Action dated Oct. 13, 2017 in U.S. Appl. No. 14/591,476.
Final Office Action dated Oct. 13, 2017 in U.S. Appl. No. 14/591,541.
Final Office Action dated Oct. 19, 2016 in U.S. Appl. No. 14/601,761.
Final Office Action dated Sep. 19, 2017 in U.S. Appl. No. 15/221,088.
Final Office Action from U.S. Appl. No. 15/259,884, dated Oct. 11, 2018.
Invitation to Pay Additional Fees dated Jun. 18, 2018 in PCT/US2018/028619.
Invitation to Pay Additional Fees in PCT/US2018/048378 dated Oct. 26, 2018.
Invitation to Pay Additional Fees in PCT/US2018/048381 dated Oct. 9, 2018.
IPRP from PCT/US2015/013482, dated Aug. 2, 2016.
IPRP from PCT/US2015/013484, dated Aug. 2, 2016.
IPRP from PCT/US2015/013487, dated Aug. 2, 2016.
IPRP from PCT/US2015/013505, dated Aug. 2, 2016.
IPRP from PCT/US2015/013510, dated Aug. 2, 2016.
IPRP from PCT/US2017/030139 dated Oct. 30, 2018.
IPRP from PCT/US2017/030179 dated Oct. 30, 2018.
ISR and Written Opinion for PCT/US2018/048374 dated Nov. 26, 2018.
ISR and Written Opinion for PCT/US2018/048378 dated Dec. 20, 2018.

(56) References Cited

OTHER PUBLICATIONS

ISR and Written Opinion for PCT/US2018/048381 dated Dec. 14, 2018.
ISR and Written Opinion from PCT/US2015/013794, dated Jun. 19, 2015.
ISR and Written Opinion from PCT/US2016/015939, dated Jun. 3, 2016.
ISR and Written Opinion from PCT/US2016/015941, dated Apr. 21, 2016.
ISR and Written Opinion from PCT/US2016/015942, dated Apr. 11, 2016.
ISR and Written Opinion from PCT/US2016/044039, dated Oct. 6, 2016.
ISR and Written Opinion from PCT/US2016/045793, dated Oct. 18, 2016.
ISR and Written Opinion from PCT/US2016/047769, dated Dec. 30, 2016.
ISR and Written Opinion from PCT/US2016/050728, dated Nov. 18, 2016.
ISR and Written Opinion from PCT/US2016/051261, dated Nov. 18, 2016.
ISR and Written Opinion from PCT/US2017/030139, dated Jul. 19, 2017.
ISR and Written Opinion from PCT/US2017/030179, dated Jul. 27, 2017.
ISR and Written Opinion from PCT/US2018/021627, dated May 31, 2018.
ISR and Written Opinion from PCT/US2018/028619, dated Aug. 9, 2018.
Non-Final Office Action dated Apr. 13, 2016 in U.S. Appl. No. 14/601,793.
Non-Final Office Action dated Apr. 14, 2016 in U.S. Appl. No. 14/601,761.
Non-Final Office Action dated Apr. 20, 2018 in U.S. Appl. No. 15/221,088.
Non-Final Office Action dated Dec. 23, 2016 in U.S. Appl. No. 15/221,088.
Non-Final Office Action dated Feb. 22, 2017 in U.S. Appl. No. 14/591,541.
Non-Final Office Action dated Feb. 27, 2017 in U.S. Appl. No. 14/591,476.
Non-Final Office Action dated Jan. 16, 2018 in U.S. Appl. No. 14/591,528.
Non-Final Office Action dated Jan. 9, 2018 in U.S. Appl. No. 15/259.884.
Non-Final Office Action dated Jul. 6, 2018 in U.S. Appl. No. 15/241,771.
Non-Final Office Action dated Jun. 1, 2018 in U.S. Appl. No. 15/262,539.
Non-Final Office Action dated Jun. 7, 2018 in U.S. Appl. No. 14/591,476.
Non-Final Office Action dated Jun. 7, 2018 in U.S. Appl. No. 15/410,283.
Non-Final Office Action dated Mar. 16, 2016 in U.S. Appl. No. 14/591,476.
Non-Final Office Action dated Mar. 16, 2016 in U.S. Appl. No. 14/591,541.
Non-Final Office Action dated May 2, 2017 in U.S. Appl. No. 14/610,299.
Non-Final Office Action from U.S. Appl. No. 15/548,352 dated Oct. 10, 2018.
Notice of Allowance dated Jan. 18, 2018 in U.S. Appl. No. 14/601,761.
Notice of Allowance dated Jun. 19, 2018 in U.S. Appl. No. 14/601,761.
Notice of Allowance dated Jun. 7, 2018 in U.S. Appl. No. 14/591,541.
Notice of Allowance dated Oct. 7, 2016 in U.S. Appl. No. 14/601,793.
Search Report from RU Application No. 2016135213 dated Feb. 12, 2018.
Supplementary Partial European Search Report from EP Application No. 15743214.7 dated Sep. 12, 2017.
Translation of Official Notification of RU Application No. 2016135213 dated Feb. 12, 2018.
Invitation to Pay Additional Fees in PCT/US2018/057401 dated Dec. 19, 2018.
Final Office Action for U.S. Appl. No. 15/262,539 dated Jan. 4, 2019.
Gago et al., "Growth mechanisms and structure of fullerene-like carbon-based thin films: superelastic materials for tribological applications," Trends in Fullerene Research, Published by Nova Science Publishers, Inc. (2007), pp. 1-46.
Co-pending U.S. Appl. No. 17/239,041, inventors Hardman Ned; J. et al., filed Apr. 23, 2021.
Co-pending U.S. Appl. No. 17/245,296, inventors Johnson Peter; L. et al., filed Apr. 30, 2021.
Co-pending U.S. Appl. No. 17/329,532, inventors Taylor Roscoe; W. et al., filed May 25, 2021.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
U.S. Appl. No. 14/610,299 Office Action dated Feb. 17, 2021.
U.S. Appl. No. 15/229,608 Office Action dated Feb. 1, 2021.
U.S. Appl. No. 15/259,884 Office Action dated Jun. 18, 2021.
U.S. Appl. No. 16/097,035 Office Action dated May 10, 2021.
U.S. Appl. No. 16/097,039 Notice of Allowance dated Jun. 14, 2021.
U.S. Appl. No. 16/855,276 Office Action dated Apr. 5, 2021.
Co-pending U.S. Appl. No. 17/412,913, dated Aug. 26, 2021.
Co-pending U.S. Appl. No. 17/473,106, inventors Taylorroscoe; W et al., dated Sep. 13, 2021.
U.S. Appl. No. 15/548,346 Office Action dated Jul. 16, 2021.
U.S. Appl. No. 15/548,352 Office Action dated Sep. 21, 2021.
U.S. Appl. No. 16/445,727 Office Action dated Aug. 17, 2021.

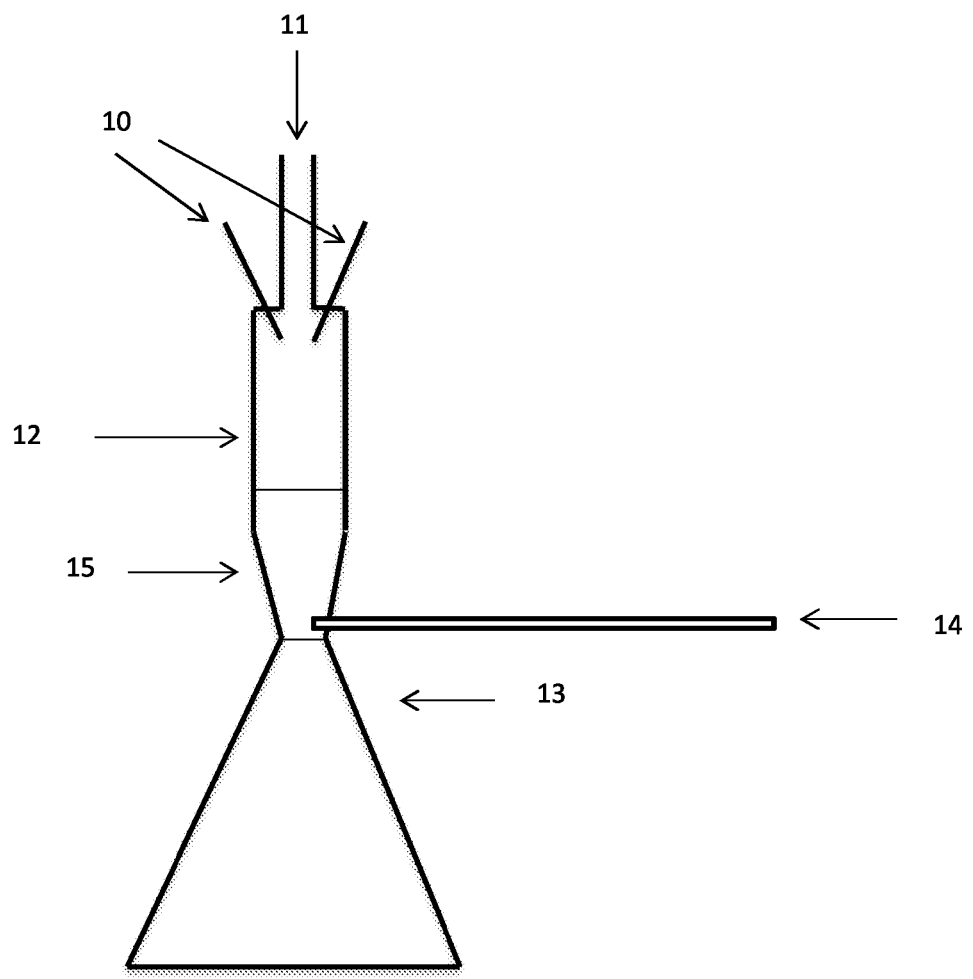

PLASMA GAS THROAT ASSEMBLY AND METHOD

CROSS-REFERENCE TO RELATED APPLICATIONS

This application is a Continuation of U.S. application Ser. No. 14/601,761, filed Jan. 21, 2015, which application claims the benefit under 35 U.S.C. § 119(e) of U.S. Provisional Application No. 61/933,479, filed Jan. 30, 2014, the disclosures of which are expressly incorporated herein in their entirety.

TECHNICAL FIELD

The field of art to which this invention generally pertains is methods and apparatus for making use of electrical energy to effect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. Because of the high temperatures involved, the high flow rates used for both energy and feedstock, and the difficulties involved with trying to control the properties of products resulting from such complex processes, there is a constant search in the art for ways to not only produce such products in more efficient and effective ways, but to improve the properties of the products produced as well.

The systems described herein meet the challenges described above while accomplishing additional advances as well.

BRIEF SUMMARY

A method of making carbon black is described by flowing a plasma gas into a plasma forming region and forming a plasma. The plasma is flowed through a throat region which is connected to a carbon black forming region. The throat region is narrower than the plasma forming region causing the plasma to accelerate and become turbulent prior to the exit point of the throat if not already turbulent in the plasma forming region. A carbon black forming feedstock is injected into the throat region, resulting in the formation in the carbon black forming region of a carbon black with increased surface area, reduced grit and/or reduced extract levels.

Embodiments of the invention include: the method described above where the throat and/or carbon black forming feedstock injecting region is cooled in the area of the carbon black forming feedstock injection; the method described above where the region is cooled by water cooling; the method described above where the region is cooled by preheating the gas fed to the plasma chamber; the method described above where the throat region has a center section and the carbon black forming feedstock is injected radially inwards towards the center section; the method described above where the throat region has a center section and the carbon black forming feedstock is injected radially outwards away from the center section; the method described above where the throat region has a center section and a wall section and the carbon black forming feedstock is injected with an axial component either from the center or from the wall of the throat; the method described above where the carbon black feedstock is injected within about + to about −5 diameters of the throat; the method described above where the throat is wider at the plasma entry point than at the plasma exit point and the feedstock is injected at or near the plasma exit point. The carbon black product produced by this process is also described.

An apparatus for making carbon black is also described containing a plasma forming section having a plasma gas forming entry port, plasma forming electrodes, and a formed plasma exit port in fluid flow communication with a separate carbon black forming section. A throat section connects the plasma forming section to the carbon black forming section. The throat section is narrower than the plasma forming section causing the plasma to accelerate and become turbulent, or maintain or increase turbulence, prior to the exit point of the throat section. The throat section also contains a carbon black forming feedstock injector.

Additional embodiments include: the apparatus described above where the throat section is wider at the plasma entry point then at the plasma exit point; the apparatus described above where the throat section contains one or more throat and/or injector cooling channels; the apparatus described above where the cooling channels are water cooling channels; the apparatus described above where the cooling channels are plasma gas cooling channels which preheat the gas and feed it to the plasma chamber; the apparatus described above where the carbon black forming feedstock injector is removable; the apparatus described above where the throat section is removable; the apparatus described above where the throat section has a center region and the carbon black forming feedstock injector has one or more injectors pointing radially inwards towards the center region; the apparatus described above where the throat section has a center region and the carbon black forming feedstock injector comprises one or more injectors within the center region pointing radially outwards away from the center region; the apparatus described above where the throat section has a center section and a wall section and the carbon black forming feedstock injector has an axial component pointing either away from the center or away from the walls of the throat section; the apparatus described above where one or more of the carbon black forming feedstock injectors is positioned at or near the throat exit, so as to inject the feedstock into the turbulence generated by the throat section and/or its discharge; the apparatus described above where the one or more injectors is positioned just after and in close proximity or next to the throat section exit.

These, and additional embodiments, will be apparent from the following descriptions.

BRIEF DESCRIPTION OF THE DRAWING

The FIGURE shows a schematic representation of a typical apparatus described herein.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

As described herein, the use of a constriction or throat section between the plasma section and carbon black reaction section causes plasma gas to accelerate to at least transitional and preferably turbulent flow conditions before the injection of the carbon black feedstock, e.g., natural gas. This reduces plasma-feedstock mixing length, and the rapid mixing caused by the turbulence increases surface area and reduces grit and extract in the carbon black formed. The throat region and the natural gas or other feedstock injector assembly can be either individually cooled, e.g., water-cooled or plasma gas cooled, or cooled together in order to reduce the heat load on the injectors, and in so doing help prevent coking on the injector and in the throat. While stock injectors can be used, typically the injectors will be customized so as to optimize the benefits imparted by the throat design. The injectors are typically made of steel, stainless steel, copper, other metals, and ceramics. The throat materials can be made of the same materials used in the plasma and reactor sections, water cooled metals, graphite, ceramic, etc.

In one embodiment, the carbon black generating feedstock is injected just downstream of the narrowest portion of the throat. So, for example, in the apparatus described herein, one or more of the carbon black forming feedstock injectors is positioned at or just after the throat exit, so that the one or more injectors injects the feedstock into the turbulent eddies generated by the throat or the increased turbulence generated at or near its discharge.

While the throat may be wider at the plasma entry point than at the plasma exit point as described herein, the throat may also have a cylindrical section of a constant diameter, that is typically smaller than in the plasma generation region. However, the increased turbulence in the throat region is most important, and that the feedstock gets injected into a partially or fully turbulent throat, which will typically be narrower than the plasma formation region. As long as the desired turbulence is achieved in the throat region, even if the plasma technology generates the plasma in a similar sized or narrower plasma formation region, the desired carbon black with improved properties can be produced.

When sloped, the slope of the throat can be any angle to achieve the turbulence desired, e.g., about 10° to about 90°. For example, the throat could have an entrance angle of about 20° to minimize recirculation, and a discharge angle large enough to get separation of the flow from the wall (typically greater than about 15°, for example, about 45°). The plasma chamber dimensions are set to give a stable plasma flow and other design parameters for making the plasma. The throat then accelerates the gas velocity. The primary goal is to achieve turbulence.

Briefly, the feedstock that can be used can be preferably methane or natural gas. Methane is the majority component of natural gas, wherein methane comprises 85% or greater of the natural gas by mass. The other components can comprise ethane, propane, and other higher molecular weight hydrocarbons in addition to other impurities. Additionally, other hydrocarbon feedstocks can be used such as ethane, propane, ethylene, acetylene, oil, pyrolysis fuel oil (pfo) as non-limiting examples. Combinations of these feedstocks can also be used as suitable carbon black feedstock material for this process.

The natural gas (or other feedstock) injector can be a removable subassembly that allows, for example, for inspection or injector nozzle replacement during operation. The entire throat assembly can also be removable. This would enable swapping the assembly for one of different dimensions and so change the mixing conditions or injector arrangements, as well as to enable replacement of damaged equipment, or just to withdraw damaged equipment out of the hottest part of the process so as to limit any additional damage during cool down of the system. In that regard, possible injector arrangements can be multiple injectors pointing radially inwards toward the central region of the throat, or a central injector with multiple jets pointing radially outwards from the central region of the throat. Injection of the gas with an axial component will reduce the shear rate at the point of injection, but may be desirable due to mechanical constraints, to reduce grit or other quality concerns.

Typically plasma-based reactor designs do not separate the reactor into a plasma region and a reactor region. The injection of natural gas in these systems is typically done into a large open volume area with plasma gas flowing slowly inwards from the top and a large circulating black cloud of reacting gas filling this volume area. The mixing of plasma gas and natural gas in such an arrangement is poorly controlled as the recirculation patterns may drive some natural gas towards the hot plasma while some other fraction of the natural gas will be forced towards cooler parts of the reactor. The product generated would also have a wide range of residence times within the reactor.

As described herein, the reactor is separated into two sections or zones, a plasma zone and a reactor zone, with natural gas or other feedstock injection taking place in the area in-between. The throat is used not only to separate the two regions but to accelerate the plasma gas so that more intense mixing can take place in a smaller region. The throat is therefore defined as the narrowest section between the plasma zone and the reactor zone. The length of the throat can be several meters or as small as about 0.5 to about 2 millimeters. The narrowest point of the throat is defined as the most narrow diameter of the throat+20%. Any cross-section that is within 10% of the most narrow cross-section is deemed to be within the scope of the throat. Preferable injection points into the reactor are about 5 diameters upstream of the throat and about 5 diameters downstream of the throat. One diameter is defined as the diameter of the throat at the most narrow point of the throat. Optionally the injection can occur within about +/−2 diameters or about +/−1 diameter of the throat.

Compared to the open volume approach, the mixing lengths and times are much shorter and time-temperature history of the natural gas (or other feedstock) is much more controlled resulting in a narrower distribution of time temperatures for the injected feedstock. This results in increased surface area as well as reduced grit and extract levels in the carbon black product produced.

In an open reactor, injectors are exposed to the relatively low temperatures of the reactor "cloud." In this throat design, the injectors are exposed to plasma gas at, e.g., 3000° C., as well as high radiation heat flux from a high temperature throat wall that has been heated to similar temperatures. This would typically cause injector and wall coking as well as pose challenges in terms of the survivability of these parts. Water cooling of the exposed surfaces of the injectors as well as the surrounding surfaces (the interior of the throat) will reduce the radiative and convective heat fluxes, reducing surface temperatures and so prevent or reduce coking and allow the parts to survive the high temperature bulk flow conditions. Cooling channels or other contact areas can be designed into/onto these parts to accomplish such cooling. It is also possible to provide such cooling by recycling the gas to be used in the plasma chamber by preheating the gas fed to the plasma chamber.

It is also possible to capture many of the product quality improvements without subjecting the injectors to the full throat temperature, for example by placing the injectors downstream of the throat where they would see the lower reactor temperature, but injecting the natural gas or other feedstock in a way so that it gets carried or swept into the highly turbulent throat discharge. For example, the injectors could inject the natural gas or feedstock into the potential core of the throat discharge.

The mere separation of the reactor into a plasma region and a reactor region would not realize all of the advantages described herein. Even with a throat-like constriction separating the two regions, if the natural gas or other feedstock material is injected outside, e.g., below the throat region, into the open volume of the reactor region, while an improvement over the completely open reactor approach, the plasma-feedstock mixing cannot be as well controlled as with injection in the throat. Injectors outside the throat area are also subjected to relatively low temperatures as they interact with the cloud of reacting gas.

As mentioned above, in order to provide better flexibility in the type of injectors and injection methods used, the (e.g., water or plasma gas) cooled throat and/or the injector subassembly can be designed as removable modules (rather than pieces that are integrated into the reactor design, requiring more significant effort to remove or reconfigure them). This can provide for such things as: the removal and inspection of the injectors, for example, even while the reactor is at operating temperature and/or full of plasma forming gas such as hydrogen; the replacement of injector tips, for example, to change injection velocity even while the reactor is at operating temperature and/or full of plasma forming gas such as hydrogen; switching between central injectors (e.g., "stinger") and radial injectors; etc.

Referring to the FIGURE, which is a schematic representation of one typical system described herein, conventional plasma gas (11) such as oxygen, nitrogen, argon, helium, air, hydrogen, etc. (used alone or in mixtures of two or more) is injected into a plasma forming area (12) containing conventional plasma forming electrodes (10) (which are typically made of copper, tungsten, graphite, molybdenum, silver etc.). The thus-formed plasma then enters into the throat or constricted region (15) causing the increased velocity and turbulence described above. It is at this point that the carbon black forming feedstock (14), e.g. natural gas or methane, is introduced into the system. The feedstock can be injected just prior to the throat (within about 5 diameters), anywhere within the throat, or downstream of the throat (within about 5 diameters). The mixed feedstock and plasma then enter into the reaction zone (13) generating a carbon black product.

EXAMPLE

Hydrogen gas is run by a conventional plasma electrode assembly to generate a temperature of 3000° C. in the plasma forming zone. The plasma formed then flows through a constricted throat area where it increases in velocity and turbulence. It is at this point in the throat area that methane gas is injected into the turbulent plasma. The plasma-methane gas mixture then flows rapidly into a reaction zone resulting in the production of a carbon black with increased surface area, reduced grit and/or reduced extract levels.

TABLE

| Properties | Units | Sample 1 | Sample 2 | Sample 3 |
| --- | --- | --- | --- | --- |
| Grade | | N234 | N550 | N762 |
| Q in* | kW | 8000 | 6466 | 9000 |
| thermal efficiency | % | 95% | 95% | 95% |
| Q heat | kW | 7600.0 | 6142.4 | 8550.0 |
| H2 temp @ inlet | C. | 150 | 150 | 150 |
| | K | 423 | 423 | 423 |
| H2 temp @ throat | C. | 3200 | 3200 | 3200 |
| | K | 3473 | 3473 | 3473 |

TABLE-continued

| Properties | Units | Sample 1 | Sample 2 | Sample 3 |
|---|---|---|---|---|
| Reaction Temperature | C. | 1800 | 1450 | 1400 |
|  | K | 2073 | 1723 | 1673 |
| Reactor pressure | atm | 1.2 | 1.2 | 1.2 |
| $H_2$ to plasma formation | kg/sec | 0.071 | 0.057 | 0.080 |
|  | ks/hr | 255 | 206 | 286 |
|  | $Nm^3/hr$ | 2829 | 2287 | 3183 |
| carbon yield | % | 95% | 95% | 95% |
| $CH_4$ feed temp | C. | 150 | 150 | 150 |
| $CH_4$ Reaction temp | C. | 1800 | 1450 | 1400 |

*Q is energy flow. Qin is the power into the plasma torch. Q heat is the heat coming out of the plasma torch. The efficiency is shown as 95% (the 5% being lost in the power supply, water cooling of parts of the torch etc).

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for making carbon black comprising, a plasma forming section having a plasma gas forming entry port, plasma forming electrodes, and a formed plasma exit port in fluid flow communication with a carbon black forming section, a throat section connecting the plasma forming section to the carbon black forming section, the throat section being narrower than the plasma forming section causing the plasma formed to accelerate and become turbulent, maintain the turbulence, or become more turbulent in the throat region, and a carbon black forming feedstock injector within the throat section, wherein the throat section has a center region and the carbon black forming feedstock injector comprises one or more injectors within the center region pointing radially outwards away from the center region.

2. The apparatus of claim 1 wherein the throat section is wider at the plasma entry point then at the plasma exit point.

3. The apparatus of claim 1 wherein the throat section contains one or more throat and/or injector cooling channels.

4. The apparatus of claim 3 wherein the cooling channels are water cooling channels.

5. The apparatus of claim 3 wherein the cooling channels are plasma gas cooling channels configured to cool the throat and/or injectors by preheating a plasma gas prior to feeding the plasma gas to the plasma forming section.

6. The apparatus of claim 1 further comprising a removable subassembly comprising the carbon black forming feedstock injector.

7. The apparatus of claim 1 further comprising a removable throat assembly comprising the throat section.

8. The apparatus of claim 1 wherein the throat section has an entry section and an exit section and one or more of the carbon black forming feedstock injectors is at or near the throat exit, so as to inject the feedstock into the turbulence generated by the throat section and/or its discharge.

9. The apparatus of claim 8 wherein the one or more injectors is just after but in close proximity to the throat exit.

* * * * *